(12) United States Patent
Netravali et al.

(10) Patent No.: US 7,471,632 B2
(45) Date of Patent: Dec. 30, 2008

(54) METHODS AND DEVICES FOR SELECTING INTERNET ROUTING PATHS

(75) Inventors: Arun Narayan Netravali, Westfield, NJ (US); Krishan Kumar Sabnani, Westfield, NJ (US); Ramesh Viswanathan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 801 days.

(21) Appl. No.: 10/953,554

(22) Filed: Sep. 30, 2004

(65) Prior Publication Data

US 2006/0067294 A1 Mar. 30, 2006

(51) Int. Cl.
*H04J 1/16* (2006.01)
*H04L 12/56* (2006.01)

(52) U.S. Cl. .................. 370/238; 370/254; 370/252; 709/238

(58) Field of Classification Search .......... 370/252, 370/254, 237, 238, 239; 709/238–242
See application file for complete search history.

(56) References Cited

U.S. PATENT DOCUMENTS

| | | | |
|---|---|---|---|
| 5,854,899 A * | 12/1998 | Callon et al. ............. | 709/238 |
| 6,016,306 A | 1/2000 | Le Boudac et al. | |
| 6,671,819 B1 * | 12/2003 | Passman et al. ............. | 714/4 |
| 6,704,795 B1 | 3/2004 | Fernando et al. | |
| 7,197,040 B2 * | 3/2007 | Bressoud et al. ............. | 370/401 |
| 2003/0095504 A1 | 5/2003 | Ogier | |
| 2005/0036486 A1 * | 2/2005 | Sahinoglu et al. ........... | 370/389 |

OTHER PUBLICATIONS

Chen J et al: "A New Approach to routing with dynamic metrics" INFOCOM '99. Eighteenth Annual Joint Conference of the IEEE Computer and Communications Societies. Proceedings. IEEE New York, NY, USA Mar. 21-25, 1999, Piscataway, NJ, USA, IEEE, US, vol. 2, Mar. 21, 1999, pp. 661-670, XP010323807 ISBN: 0-7803-5417-6 Chapters II, III.
Jorge A. Cobb, Mohamed G. Gouda, Ravi Musunuri: "A Stabilizing Solution to the Stable Path Problem" International Symposium on Self-Stabilizing Systems (SSS), Lecture Notes in Computer Science 2704, [Online] Jun. 23-25, 2003, pp. 169-183, XP002354444 Retrieved from the Internet: URL:http://www.utdallas.edu/~musunuri/Academics/sss03.pdf> [retrieved on Oct. 16, 2005] Chapter 3.
Zhenhai Duan et al: "Damping BGP route flaps" Performance, Computing, and Communications, 2004 IEEE International Conference on Phoenix, AZ Apr. 15-17, 2004, Piscataway, NJ, USA, IEEE, Apr. 15, 2004, pp. 131-138, XP010770054 ISBN: 0-7803-8396-6.
European Search Report.

* cited by examiner

*Primary Examiner*—John Pezzlo

(57) ABSTRACT

Network convergence is greatly reduced because new routing paths are only selected when they are substantially better than pre-existing, best available paths.

11 Claims, 1 Drawing Sheet

METHODS AND DEVICES FOR SELECTING INTERNET ROUTING PATHS

BACKGROUND OF THE INVENTION

Devices known as routers are responsible for selecting the best path or paths to route information from one location or node within the Internet to another. For example, when information needs to be sent from a node within one network to a node within a different network, a router using a Border Gateway Protocol ("BGP") (hereafter "BGP router") is assigned the task of determining the best path or paths.

Because new nodes are constantly being added, deleted, etc. from networks making up the Internet, at any given point in time the best path from one node to another may change very rapidly. Realizing this, existing techniques provide BGP routers (sometimes called BGP speaker nodes) with the capability of comparing a pre-existing, best available path with a next available path formed when a change occurs to a given network. If the next available path is determined to be better than the pre-existing, best available path, then the next available path will be given the status of "best available path". Thereafter, this new path will be used to route information in place of the pre-existing path (i.e., old, best available path).

When a new path is selected a BGP router is responsible for generating a forwarding table(s) associated with this new path. Once generated, the forwarding table is stored within the BGP router. When a packet arrives at the BGP router it is forwarded on using the stored forwarding table.

A BGP router is constantly comparing its pre-existing, stored best available path to next available paths. If a next available path is even slightly better than a pre-existing, best available path, then existing techniques require a BGP router to replace the pre-existing best available path with the new path. Thus, a given BGP router may be constantly updating its forwarding tables. Complicating matters further, each time a new, best available path is determined, it must be transmitted (referred to as "advertised") to neighboring nodes (e.g., neighboring BGP routers). Upon receiving a new, best available path, the neighboring nodes will also update their forwarding tables. Thereafter, these neighboring nodes will advertise to their neighboring nodes and so on. Thus, any change by one BGP router has a cascading effect upon other BGP routers.

Inherent in this comparison, selection, advertisement and updating process is a time requirement. That is, relatively speaking, the comparison, selection, advertising and updating process takes up a significant amount of time. During this time it may not be possible to forward a received packet on to a next node until the process has been completed. For example, even though the comparison, selection and updating and advertising process has been completed at some nodes along a path, this process may not be completed at other nodes. As a result, any attempt to forward a packet along the path may be unsuccessful (i.e., the packet will not reach its destination) until each of the nodes along the path have completed their comparison, selection, updating and advertising process.

Other times a phenomena called "looping" occurs which results in a packet being sent back toward a preceding node instead of being forwarded on to a subsequent node.

Only when each node in the network has completed its comparison, selection and updating (and associated advertising) process can it be assured that a packet can successfully be transferred over any given path. When each node finishes this process, a network is said to have "converged." This may take, relatively speaking, a substantial amount of time. The faster a network converges, the faster a packet can be transferred.

It is, therefore, desirable to provide for methods and devices which reduce the amount of time it takes a network to converge.

SUMMARY OF THE INVENTION

We have recognized that the time it takes for a network to converge can be significantly reduced by reducing delays associated with computing routing paths. In one embodiment of the present invention, a detected next available path will only be selected as a best available path if it is substantially better than the pre-existing, best available path.

Because some detected, next available paths will not be substantially better than pre-existing, best available paths, some of the detected paths will not be selected. When a path is not selected, there is no need for a BGP router to update its forwarding table. There is also no need to advertise the unselected path to its neighbors. It is believed by the present inventors that this may greatly reduce the number of times a BGP router needs to update its forwarding tables and reduce cascading, thereby reducing the time it takes a network to converge.

DETAILED DESCRIPTION OF THE INVENTION

Figure 1:
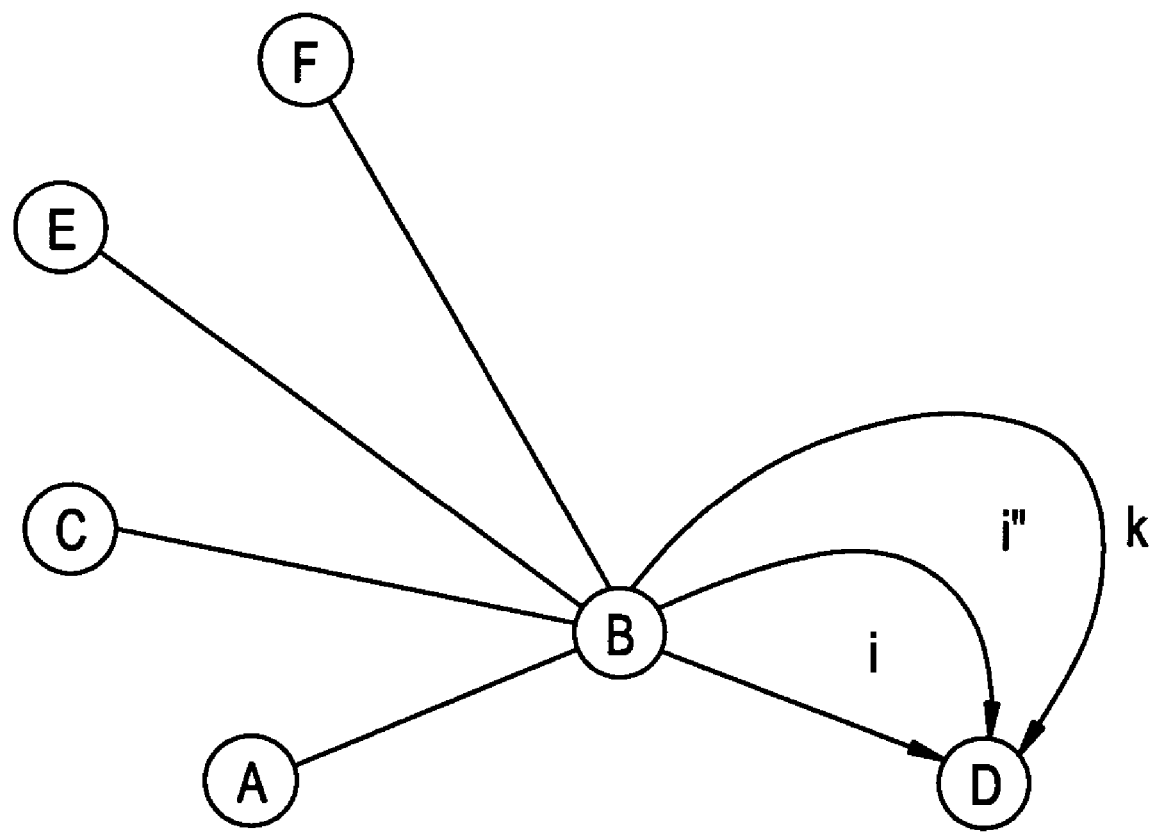
FIG. 1 depicts nodes, such as BGP routers, that are operable to compute Internet routing paths according to embodiments of the present invention.

Referring now to FIG. 1, there is shown a number of routers A, B, C, D, E and F. These routers may be BGP routers. Each of the BGP routers A-F stores forwarding tables, where each table is associated with a best available routing path. For example, suppose at some earlier point in time, BGP router B has compared the routes which lead to BGP router D and has selected route i as the best available path to BGP router D. Thereafter, BGP router B may be operable to store a forwarding table associated with route i in order to route incoming packets to BGP router D.

Suppose further that in the next instant of time a next available path i" is detected. In one embodiment of the present invention, BGP router B is operable to compare the next available path i" to the pre-existing, best available path i. If this comparison results in a determination that the next available path i" is substantially better (e.g., cost-wise, length-wise, time-wise or otherwise comparatively better) than the pre-existing, best available path i, then the BGP router B is further operable to select the next available path i" as the new, best available path. However, if the results of the comparison determine that the next available path i" is not substantially better than the pre-existing, best available path i, then the BGP router B is operable to maintain the pre-existing, best available path i as the best available path.

Such comparisons may take the form of comparing the length or cost of a next available path with the length or cost of a pre-existing best available path and only selecting the next available path if its length/cost is substantially shorter/less than that of the pre-existing, best available path. Alternatively, one or more known metrics or weights may be assigned to the pre-existing, best available path and the detected next available path. Upon comparing the metrics or weights, the next available path will be selected only if the metric or weight is substantially better than the metric or weight associated with the pre-existing, best available path. In yet a further embodiment of the invention, the metric or weight associated with the next available path maybe compared to a threshold or the like. Only if the metric or weight equals or exceeds the threshold (which acts as an indicator that the next available path is substantially better than the pre-existing best available path) is the next available path selected. It should be understood that a metric or weight may be associated with a length, cost, transmission channel quality, error rate, etc . . . . It should be understood that these are just some of the metrics and weights which may be used to determine whether the detected next available path is substantially better than a pre-existing, best available path.

For example, the next available path may be associated with a higher cost because it traverses a network operated by an entity which is not affiliated with the entity which operates a given BGP router. In contrast, the cost associated with the pre-existing, best available path may be lower than the cost associated with the detected next available path because the pre-existing, best available path traverses a network that is operated by an affiliate of the BGP router.

By requiring that a next available path be substantially better than a pre-existing, best available path, the present invention allows BGP routers to generate new forwarding tables only when the next available path is substantially better than the pre-existing, best available path. Because many times the next available path will not be substantially better than the pre-existing, best available path, the present invention effectively reduces the number of times a given BGP router will have to generate new forwarding tables.

In addition, because it is only necessary for a BGP router to advertise or transmit new, best available paths to its neighbors, these advertisements or transmissions need only occur when the next available path is substantially better than the pre-existing, best available path. In the example above, though a next available path i" has been detected, it may not be substantially better than path i. In a further embodiment of the present invention, BGP router B would not select the next available path i" because it is not substantially better than the pre-existing best available path i. As a result, BGP router B would not need to update its forwarding table, nor would it need to advertise a new path to its neighboring nodes. As a result, neighboring routers A, C, E and F would not have to change their routing paths and associated forwarding tables either. Conversely, if BGP router B determines that i" is substantially better than path i, BGP routers A, C, E and F may have to change their pre-existing best available path to next available path i" (assuming they also know of no other path that is substantially better than i or ii) as well as their forwarding tables. Thereafter, they would also have to advertise this new path to their surrounding BGP routers (not shown in FIG. 1).

To avoid such a cascading effect when a next available path is only slightly better than a pre-existing, best available path, it will not be selected or used to route packets. Delays associated with changing forwarding tables and cascading effects are reduced, thereby reducing the time it takes a network to converge. Fast converging networks make it possible to forward received packets faster than previously thought possible.

Backtracking somewhat, it was mentioned above that metrics or weights maybe assigned to pre-existing and next available paths. It should be understood that these metrics and weights may be assigned, modified or configured (collectively "configured") by a user, network operator or the like (collectively "user") at a BGP router (i.e., they are variable, not fixed).

In yet additional embodiments of the present invention, the problems associated with so-called "looping" are prevented by the present invention. When BGP router B initially selects a next available path as a new, best available path, it determines whether the next available path will result in a packet being transmitted back (i.e., looped back) to BGP router B or any other router along the next available path. If it determines that this may occur, then this path is rejected and not selected as a new, best available path.

In addition, the present invention also allows for another comparison to ensure that the next available path i", for example, is in fact the best path of all known paths. For example, though i" may be substantially better than i, at the same time the next available path i" becomes available, changes may occur to another path, for example, path k. To ensure that the next available path, i", is not only substantially better than the pre-existing, best available path i, but is also the best path of all known paths (where it is assumed that path k is previously known to BGP router B), the next available path i" will only be selected provided it is indeed the best path among all known paths, in this case the best path among paths i i" and k. This proviso holds true for each BGP router shown in FIG. 1.

In a further embodiment of the present invention, once BGP router B selects a new best available path (e.g., i") and advertises this new path to its surrounding neighbors, it should be understood that the pre-existing best available path i can no longer be used by BGP router A, etc. . . . Said another way, BGP router A may be further operable to determine whether the pre-existing, best available path i traverses a neighboring node (e.g., BGP router B) which has advertised a next available path (e.g., i"). If this is the case, then the BGP router A is further operable to select the next available path i" (provided, of course, this next available path, i", has been determined to be the best path along all known paths, i and k.)

In yet a further embodiment of the present invention, each BGP router of the present invention may assign a different metric or weight to each best available path. Because of this, when each BGP router carries out its own comparison process, each BGP router may generate a different comparison result.

The discussion above has set forth some of the examples of the present invention. The true scope of the present invention, however, is set forth in the claims which follow.

We claim:

1. A method for selecting Internet routing paths comprising:
   comparing a metric, associated with a next available path for routing a packet, to a threshold metric associated with a pre-existing path; and
   selecting the next available path as a best available path when the metric associated with the next available path equals or exceeds the threshold metric; and
   advertising a new path when the next available path is selected as the best available path.

2. The method as in claim 1 further comprising:
   determining whether the pre-existing path traverses a neighboring node which has advertised the next available path; and
   selecting the next available path provided the next available path is the best path among all known paths when it is determined that the pre-existing path traverses a neighboring node that has advertised the next available path.

3. The method as in claim 1 wherein the comparison and selection occurs at a Border Gateway Protocol (BGP) router.

4. The method as in claim 1 wherein the metric is selected from a group consisting of at least cost, length, channel quality and error rate.

5. The method as in claim 1 wherein the metric associated with the next available path is configurable.

6. The method as in claim 5 further comprising configuring the metric associated with the next available path at a router.

7. A device for selecting Internet routing paths operable to:
compare a metric, associated with a next available path for routing a packet, to a threshold metric associated with a pre-existing path; and
select the next available path as a best available path when the metric associated with the next available path equals or exceeds the threshold metric; and
advertise a new path when the next available path is selected as the best available path.

8. The device as in claim 7 further operable to:
determine whether the pre-existing path traverses a neighboring node which has advertised the next available path; and
select the next available path provided the next available path is the best path among all known paths when it is determined that the pre-existing path traverses a neighboring node that has advertised the next available path.

9. The device as in claim 7 wherein the device comprises a Border Gateway Protocol (BGP) router.

10. The device as in claim 7 wherein the metric is selected from a group consisting of at least cost, length, channel quality and error rate.

11. The device as in claim 7 wherein the metric associated with the next available path is configurable.

* * * * *